(12) United States Patent
Wang et al.

(10) Patent No.: US 8,599,380 B2
(45) Date of Patent: Dec. 3, 2013

(54) METHOD OF CONSTRUCTING LIGHT-MEASURING LOOK-UP TABLE, LIGHT-MEASURING METHOD, AND LIGHT-MEASURING SYSTEM

(75) Inventors: Tsun-I Wang, Taoyuan Hsien (TW); Ching-Jang Feng, Taoyuan Hsien (TW); Chih-Chiao Chang, Taoyuan Hsien (TW)

(73) Assignee: Chroma Ate, Inc., Taoyuan Hsien (TW)

( * ) Notice: Subject to any disclaimer, the term of this patent is extended or adjusted under 35 U.S.C. 154(b) by 254 days.

(21) Appl. No.: 13/148,538

(22) PCT Filed: Aug. 3, 2009

(86) PCT No.: PCT/CN2009/000865
§ 371 (c)(1),
(2), (4) Date: Aug. 9, 2011

(87) PCT Pub. No.: WO2010/091539
PCT Pub. Date: Aug. 19, 2010

(65) Prior Publication Data
US 2012/0044496 A1 Feb. 23, 2012

(30) Foreign Application Priority Data

Feb. 10, 2009 (CN) .......................... 2009 1 0005886

(51) Int. Cl.
*G01J 3/46* (2006.01)
(52) U.S. Cl.
USPC ...................................... 356/402
(58) Field of Classification Search
None
See application file for complete search history.

(56) References Cited

U.S. PATENT DOCUMENTS

2003/0202184 A1* 10/2003 Jung et al. ................ 356/419
2005/0036668 A1* 2/2005 McLennan et al. ........... 382/128

FOREIGN PATENT DOCUMENTS

| CN | 1152239 C | 6/2004 |
|---|---|---|
| CN | 1959355 A | 5/2007 |
| CN | 200989826 Y | 12/2007 |
| JP | 10-73533 A | 3/1998 |
| JP | 2008175739 | 7/2008 |
| WO | 02057752 A1 | 7/2002 |

OTHER PUBLICATIONS

Abstract of JP2008175739.
JP Office Action dated Feb. 12, 2013.

* cited by examiner

*Primary Examiner* — Gregory J Toatley
*Assistant Examiner* — Hina F Ayub
(74) *Attorney, Agent, or Firm* — Thomas | Horstemeyer, LLP

(57) ABSTRACT

The invention discloses a method of constructing light-measuring look-up table, a light-measuring method, and a light-measuring system. The method of constructing light-measuring look-up table is to construct a look-up table by according to spectrum parameters relative to a light spectrum model, three actual color-matching functions relative to the light-measuring system and three standard color-matching functions, calculating both a look-up color coordinate and a reference color coordinate corresponding to each of the spectrum parameters. The light-measuring method includes: first, measuring a to-be-measured light by the light-measuring system to obtain actual stimulus values and calculating an actual color coordinate; then, comparing the actual color coordinate with the look-up color coordinates to determine both a to-be-measured light spectrum parameter and an estimated color coordinate relative to the to-be-measured light; furthermore, according to the to-be-measured light spectrum parameter, one of the standard color-matching functions and one of the actual stimulus values, calculating an estimated luminance.

18 Claims, 12 Drawing Sheets

| lock-up color coordinate $(x_{idx}, y_{idx})$ | spectrum parameters $(\lambda_0, \Delta\lambda_f)$ |
|---|---|
| $(x_1, y_1)$ | $(\lambda_1, \Delta\lambda_1)$ |
| $(x_2, y_2)$ | $(\lambda_2, \Delta\lambda_2)$ |
| $(x_3, y_3)$ | $(\lambda_3, \Delta\lambda_3)$ |
| $(x_4, y_4)$ | $(\lambda_4, \Delta\lambda_4)$ |

FIG.12

| look-up color coordinates ($x_{idx}, y_{idx}$) | spectrum parameters ($\lambda_0, \Delta\lambda_0$) | error corrected parameters |
|---|---|---|
| ($x_1, y_1$) | ($\lambda_1, \Delta\lambda_1$) | ($\Delta\overline{X}_1, \Delta\overline{Y}_1, \Delta\overline{Z}_1$) |
| ($x_2, y_2$) | ($\lambda_2, \Delta\lambda_2$) | ($\Delta\overline{X}_2, \Delta\overline{Y}_2, \Delta\overline{Z}_2$) |
| ($x_3, y_3$) | ($\lambda_3, \Delta\lambda_3$) | ($\Delta\overline{X}_3, \Delta\overline{Y}_3, \Delta\overline{Z}_3$) |
| ($x_4, y_4$) | ($\lambda_4, \Delta\lambda_4$) | ($\Delta\overline{X}_4, \Delta\overline{Y}_4, \Delta\overline{Z}_4$) |

FIG.13

| look-up color coordinates ($x_{idx}$, $y_{idx}$) | spectrum parameters ($\lambda_c$, $\Delta\lambda_f$) | reference color coordinate ($x_{ref}$, $y_{ref}$) |
|---|---|---|
| ($x_1$, $y_1$) | ($\lambda_1$, $\Delta\lambda_1$) | ($x_a$, $y_a$) |
| ($x_2$, $y_2$) | ($\lambda_2$, $\Delta\lambda_2$) | ($x_b$, $y_b$) |
| ($x_3$, $y_3$) | ($\lambda_3$, $\Delta\lambda_3$) | ($x_c$, $y_c$) |
| ($x_4$, $y_4$) | ($\lambda_4$, $\Delta\lambda_4$) | ($x_d$, $y_d$) |

FIG.14

| look-up color coordinates ($x_{idx}$, $y_{idx}$) | spectrum parameters ($\lambda_0, \Delta\lambda_f$) | reference error values |
|---|---|---|
| ($x_1$, $y_1$) | ($\lambda_1, \Delta\lambda_1$) | $\Delta\overline{Y}_1$ |
| ($x_2$, $y_2$) | ($\lambda_2, \Delta\lambda_2$) | $\Delta\overline{Y}_2$ |
| ($x_3$, $y_3$) | ($\lambda_3, \Delta\lambda_3$) | $\Delta\overline{Y}_3$ |
| ($x_4$, $y_4$) | ($\lambda_4, \Delta\lambda_4$) | $\Delta\overline{Y}_4$ |

FIG.15

| look-up color coordinates $(X_{idx}, Y_{idx})$ | spectrum parameters $(\lambda_0, \Delta\lambda_r)$ | reference ratios |
|---|---|---|
| $(X_1, Y_1)$ | $(\lambda_1, \Delta\lambda_1)$ | $\gamma_1$ |
| $(X_2, Y_2)$ | $(\lambda_2, \Delta\lambda_2)$ | $\gamma_2$ |
| $(X_3, Y_3)$ | $(\lambda_3, \Delta\lambda_3)$ | $\gamma_3$ |
| $(X_4, Y_4)$ | $(\lambda_4, \Delta\lambda_4)$ | $\gamma_4$ |

FIG.16

| look-up color coordinates $(x_{idx}, y_{idx})$ | spectrum parameters $(\lambda_0, \Delta\lambda_f)$ | reference adjustment coefficients |
|---|---|---|
| $(x_1, y_1)$ | $(\lambda_1, \Delta\lambda_1)$ | $k_1$ |
| $(x_2, y_2)$ | $(\lambda_2, \Delta\lambda_2)$ | $k_2$ |
| $(x_3, y_3)$ | $(\lambda_3, \Delta\lambda_3)$ | $k_3$ |
| $(x_4, y_4)$ | $(\lambda_4, \Delta\lambda_4)$ | $k_4$ |

FIG.17

METHOD OF CONSTRUCTING LIGHT-MEASURING LOOK-UP TABLE, LIGHT-MEASURING METHOD, AND LIGHT-MEASURING SYSTEM

CROSS REFERENCE TO RELATED APPLICATION

This application is the 35 U.S.C. §371 national stage of PCT application PCT/CN2009/000865, filed Aug. 3, 2009, the disclosure of which is hereby incorporated by reference.

BACKGROUND OF THE INVENTION

1. Field of the Invention

The present invention relates to a light-measuring system and method thereof. More particularly, the present invention relates to a light-measuring method and a light-measuring system with a look-up table based on a light spectrum model.

2. Description of the Prior Art

In prior art, a to-be-measured light may be measured according to the roles developed by the Commission Internationale de l'Eclairage (CIE) in 1931. The to-be-measured light is measured by the light-measuring device to obtain the tri-stimulus value. Then, the color coordinates will be obtained. However, it is difficult to manufacture the optical filters which meet three standard color-matching functions $\overline{X}_S(\lambda)$, $\overline{Y}_S(\lambda)$ and $\overline{Z}_S(\lambda)$. In fact, the actual color-matching functions of the light-measuring device shall be considered that the responsivity $R(\lambda)$ is uneven. In other words, the actual color-matching functions can be defined as $Xi(\lambda)=Ri(\lambda)Ti(\lambda)$, wherein $Ti(\lambda)$ is a penetration function of the optical filter, i=1~3. If the variations of the elements are considered, it is difficult to let $Xi(\lambda)$ equal to $\overline{X}_S(\lambda)$, $\overline{Y}_S(\lambda)$ and $\overline{Z}_S(\lambda)$.

Thus, the variations of the light-sensing element cannot be removed. In fact, the actual color-matching functions shall be normalized in measurement for decreasing the variations of the actual color-matching functions and the standard color-matching functions. In practice, a known light may be normalized. For example, an regulation constants Ai of an A light $(Ai=\int_{\lambda_1}^{\lambda_2} S_A(\lambda)\overline{X}_i(\lambda)d\lambda/\int_{\lambda_1}^{\lambda_2} S_A(\lambda)X_i(\lambda)d\lambda$, wherein i=1~3 are the said standard color-matching functions $\overline{X}_S(\lambda)$, $\overline{Y}_S(\lambda)$ and $\overline{Z}_S(\lambda)$. Thus, the stimulus values obtained by measuring the to-be-measured light, or the stimulus values calculated by the regulation constants multiplied by the integration of the actual color-matching functions and the light spectrum, have errors which cannot be avoided. For the to-be-measured light with large waviness width, such as white light, the errors can be accepted. However, for the to-be-measured light with small waviness width, such as monochromatic light, the errors cannot be ignored.

A four-color matrix method developed by Yoshihiro Ohno in 1997 (IS&T fifth color image conference 1997), is applied to correct three regulation coefficients by using the white light combined by the red light, green light and blue light. Accordingly, the chromaticity of the monochromatic light can be measured accurately. However, for the light spectrum with large variations, the errors of the light cannot be ignored.

To sum up, the errors of the light-measuring device cannot be removed in prior art. Additionally, if the variations of light spectrum used by the to-be-measured light and the normalization are too large, the errors of measuring the color coordinates will become lager.

SUMMARY OF THE INVENTION

A scope of the invention is to provide a method of constructing light-measuring look-up table, a light-measuring method and a light-measuring system. The color of the light with a spectral feature can be modeled, can be measured with a high accuracy. In the invention, the relationship between the spectrum parameters, light-measuring system and the standard color coordinates can be constructed in advance. So that, the light-measuring system can determine the accurate estimated color coordinate according to the relationship without standard color matching functions. Additionally, the spectrum parameters of the to-be-measured light can be determined with the estimated color coordinate at the same time. That is to say, the analogue light spectrum of the to-be-measured light can be constructed. According to the analogue light spectrums (or the spectrum parameters) and the standard color-matching functions, the actual stimulus value of the light-measuring system can be corrected. Then, the luminance can be obtained. Accordingly, the invention provides color measurement with high accuracy.

In an embodiment, the method of constructing light-measuring look-up table comprises the following steps of: measuring a light-measuring system for obtaining three actual color-matching functions of the light-measuring system; normalizing three actual color-matching functions by a standard light; calculating the plurality of look-up color coordinates according to a plurality of the spectrum parameters and the three actual color-matching functions; and calculating a plurality of reference color coordinates according to the plurality of spectrum parameters and the three standard color-matching functions, wherein each spectrum parameter corresponds to one of the plurality of look-up color coordinates and one of the plurality of reference color coordinates.

Wherein, the light spectrum model can be used to represent the actual spectrum of the to-be-measured light and shown in the forms of two variables. One is central wavelength variable, another is half-power full waviness width variable (Full-width half maximum). In other words, each spectrum parameter comprises a central wavelength value and a half-power full waviness width variable value, for representing a specific light spectrum. Each specific light spectrum corresponds to a look-up color coordinate calculated by the actual color-matching functions and a reference color coordinate calculated by the standard color-matching functions. Thus, the relationship between the look-up color coordinate and the reference color coordinate will be constructed by the spectrum parameters.

In the embodiment, the light-measuring system comprises a light-sensing module, a storage module and a processing module. The light-sensing module comprises a light filtration element and a light-sensing element. The light-sensing module produces three actual stimulus values by sensing at least one of the to-be-measured lights at the same time. The storage module is used to store a look-up table. The processing module is coupled to the light-sensing module and the storage. The processing module produces three actual stimulus values by capturing the photoelectric converting signal from the light-sensing module and determines the estimated color coordinates of the to-be-measured light according to the look-up table. The processing module can determine the spectrum parameters of the to-be-measured light and the estimated luminance of the to-be-measured light according to the standard color-matching functions.

Accordingly, in the embodiment, the light-measuring method comprises the following steps of: the light-measuring system measures the to-be-measured light for obtaining the three actual stimulus values according to the light-sensing module; the processing module calculates an actual color coordinate according to the three actual stimulus values; the processing module compares the actual color coordinates to the plurality of look-up color coordinates of the look-up table stored in the storage module, for determining at least one of the look-up color coordinates matched with the actual color coordinates; the processing module determines an estimated color coordinate according to at least one of the reference color coordinates of at least one of the matched look-up color coordinates, then the processing module determines a to-be-measured light spectrum parameters according to at least one of the spectrum parameters of at least one of the look-up color coordinates; the processing module calculates an adjustment coefficient or a ratio for correcting the actual stimulus values corresponding to the actual color-matching functions, according to the analogue light spectrum, one of the three actual color-matching functions and the standard color-matching functions corresponding to the actual color-matching functions. Finally, an estimated luminance can be obtained.

To sum up, the light-measuring system and the light-measuring method can determine the to-be-measured light spectrum parameters, accurate color coordinates and the luminance according to the look-up table constructed by the light spectrum model of the to-be-measured light. Accordingly, the to-be-measured light spectrum parameters, accurate color coordinates and the luminance can be determined by referring table easily and the easy calculating steps. Briefly, the look-up table can be constructed in advance for the known spectral features of the to-be-measured light. The actual measuring system and the standard measuring system can be connected so that the error can be removed. Additionally, the color values can also be measured with high accuracy to prove the error of the actual color-matching functions and standard color-matching functions. Specially, the spectral features of the quantity production of the light, such as LED, LCD or other monochromatic light, are similar. The product can be modeled according to the same spectral feature. The difference of the product can be covered by the spectrum parameters.

The advantage and spirit of the invention may be understood by the following recitations together with the appended drawings.

BRIEF DESCRIPTION OF THE APPENDED DRAWINGS

FIG. 12 illustrates a look-up table with look-up color coordinates corresponds to spectrum parameters of a light-measuring method.

FIG. 13 illustrates a look-up table with error corrected parameters corresponding to spectrum parameters of a light-measuring method.

FIG. 14 illustrates a look-up table with reference color coordinates corresponding to the spectrum parameters of a light-measuring method.

FIG. 15 illustrates a look-up table with error corrected parameters corresponding to spectrum parameters of a light-measuring method.

FIG. 16 illustrates a look-up table with reference ratios corresponding to spectrum parameters of a light-measuring method.

FIG. 17 illustrates a look-up table with reference adjustment coefficients corresponding to spectrum parameters of a light-measuring method.

DETAILED DESCRIPTION OF THE INVENTION

Figure 1A:
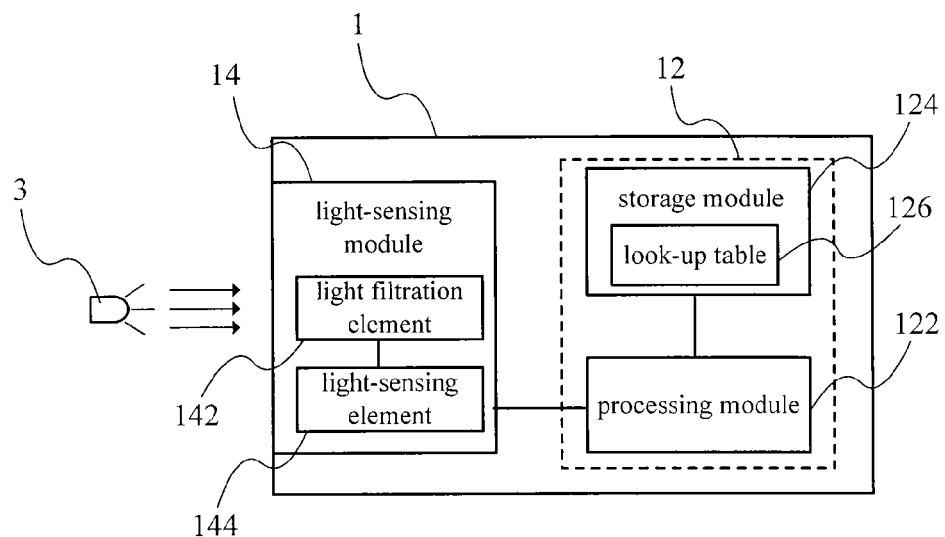
FIG. 1A illustrates a functional block diagram of a light-measuring system according to a first preferred embodiment of the invention.
Figure 1B:
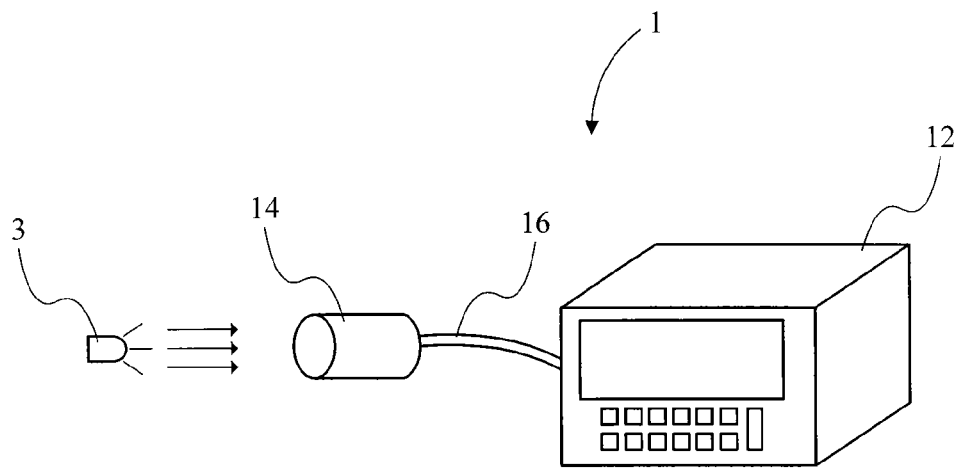
FIG. 1B illustrates a schematic diagram of a light-measuring system according to an embodiment of the invention.

Please refer to FIG. 1A and FIG. 1B. FIG. 1A illustrates a functional block diagram of the light-measuring system according to a first preferred embodiment of the invention. FIG. 1B illustrates a schematic diagram of the light-measuring system according to an embodiment of the invention. According to a first preferred embodiment, the light-measuring system 1 is used to measure a to-be-measured light 3, such as LED. The light-measuring system 1 comprises a host 12, a light-sensing module 14 and a cable 16. The host 12 is electrically connected to the light-sensing module 14 by the cable 16. The host 12 comprises a processing module 122 and a storage module 124. The processing module 122 is electrically connected to the storage module 124. Additionally, the processing module 122 is electrically connected to the light-sensing module 14 by the cable 16. The storage module 124 stores a look-up table 126. The look-up table 126 comprises a plurality of look-up color coordinates and a plurality of spectrum parameters based on a light spectrum model. Each spectrum parameter corresponds to one look-up color coordinate. The light-sensing module 14 comprises a light filtration element 142 and a light-sensing element 144.

Figure 2:
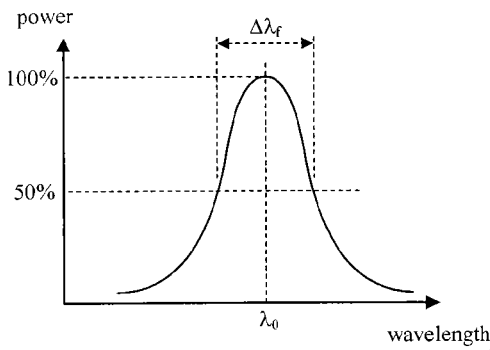
FIG. 2 illustrates a schematic diagram of a light spectrum model of a light-measuring system according to an embodiment of the invention.

Wherein, the light spectrum model 1 represents the spectral features of the to-be-measured light 3, the spectrum parameters are variable set of the light spectrum model. For example, when the to-be-measured light 3 is a monochromatic LED, the variable of the light spectrum model can be represented as a central wavelength variable $\lambda 0$ (or a wavelength $\lambda p$ with maximum power) and a half-power full waviness width variable $\Delta \lambda f$. As shown in FIG. 2, the spectrum parameters comprise the central wavelength variable $\lambda 0$ and the half-power full waviness width variable $\Delta \lambda f$. $\lambda 0$ and $\Delta \lambda f$ are represented as spectrum parameters (explained after). The mathematical model of the light spectrum model has a lot of types can be used. The symmetric spectrum can be represented as the following types of:

$$S_1(\lambda) = \exp\left(\ln 0.5 \times \frac{(\lambda-\lambda_0)^2}{\left(\frac{\Delta\lambda_r}{2}\right)^2}\right),$$

$$S_2(\lambda) = \frac{1}{1 + \frac{(\lambda-\lambda_0)^2}{\left(\frac{\Delta\lambda_f}{2}\right)^2}},$$

$$S_{31}(\lambda) = \exp\left(\ln 0.5 \times \frac{(\lambda-\lambda_0)^2}{\left(\frac{\Delta\lambda_r}{2}\right)^2}\right), \text{wherein}$$

$$\lambda_0 - \frac{\Delta\lambda_f}{2} \le \lambda \le \lambda_0 + \frac{\Delta\lambda_f}{2}.$$

$$S_{32}(\lambda) = 2\exp\left(2\ln 0.5 \times \frac{|\lambda-\lambda_0|}{\left(\frac{\Delta\lambda_f}{2}\right)}\right),$$

wherein $\lambda \le \lambda_0 - \frac{\Delta\lambda_f}{2}$ or $\lambda \ge \lambda_0 + \frac{\Delta\lambda_f}{2}$.

The asymmetric spectrum can be represented as the following types of:

$$S_4(\lambda) = \exp\left(\ln 0.5 \times \frac{(\lambda-\lambda_0)^2}{\left(\frac{\Delta\lambda_f}{2}\right)^2} \times \left(\frac{\lambda_0}{\lambda}\right)^2\right),$$

$$S_5(\lambda) = \frac{1}{1 + \left(\frac{\lambda_0}{\lambda}\right)^2 \times \frac{(\lambda-\lambda_0)^2}{\left(\frac{\Delta\lambda_f}{2}\right)^2}}$$

$$S_{61}(\lambda) = \exp\left(\ln 0.5 \times \frac{(\lambda-\lambda_0)^2}{\left(\frac{\Delta\lambda_f}{2}\right)^2} \times \left(\frac{\lambda_0}{\lambda}\right)^2\right),$$

wherein $\lambda_L \le \lambda \le \lambda_H$.

$$S_{62}(\lambda) = 2\exp\left(\ln 0.5 \times \frac{|\lambda-\lambda_0|}{\left(\frac{\Delta\lambda_f}{2}\right)} \times \frac{\lambda_0}{\lambda}\right),$$

wherein $\lambda \le \lambda_L$ or $\lambda \ge \lambda_H$, $S_{51}(\lambda_L) = S_{51}(\lambda_H) = 0.5$ Incidentally, the light spectrum model can be, but not limited to the said types. The model can be a derivation which depends on the actual spectral feature of the to-be-measured light 3 or a model which can be explained directly as the set of the numeric value.

In the manufacturing, the possible situations of the to-be-measured light 3 can be covered by the light spectrum model according to the suitable light spectrum model. The sets of the variables in the look-up table 126 are the spectrum parameters λ0 and Δλf. The actual color-matching functions of the light-measuring system 1 and the light spectrum model shall be calculated in advance to obtain the look-up color coordinates. Each look-up color coordinate corresponds to a specific light spectrum, or a spectrum parameter. Then, each light spectrum (spectrum parameter) and the CIE 1931 standard color-matching functions shall be calculated to obtain the corresponding reference color coordinates. The results of the calculation construct the look-up table 126. According to the look-up table 126, the look-up color coordinates are compared to the actual color coordinates of the to-be-measured light 3 to determine the reference color coordinates. Additionally, the standard color coordinates will be obtained. That is to say, if the spectral feature of the to-be-measured light 3 and the any light spectrum are the same, the standard color coordinates of the to-be-measured light 3 and the reference color coordinates of the light spectrums are almost the same. Furthermore, the look-up table 126 shall be constructed in the light-measuring process and storied in the storage module 124 for the post process.

Figure 3:
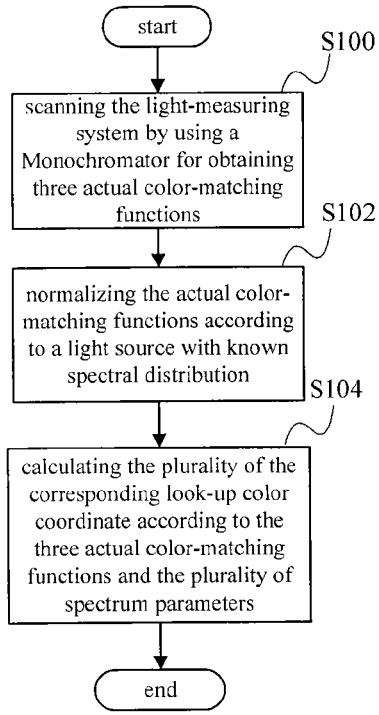
FIG. 3 illustrates a flow chart of a method of constructing light-measuring look-up table according to a first preferred embodiment of the invention.

Please refer to FIG. 3. FIG. 3 illustrates a flow chart of a method of constructing light-measuring look-up table according to a first preferred embodiment of the invention. According to the first preferred embodiment, the method of constructing light-measuring look-up table comprises the following steps. First, as shown in step S100, scanning the light-measuring system 1 by using a monochromator for obtaining three actual color-matching functions Xr(λ), Yr(λ) and Zr(λ). Then, as shown in step S102, normalizing the actual color-matching functions Xr(λ), Yr(λ) and Zr(λ) to obtain the actual color-matching functions $\overline{X}_r(\lambda)$, $\overline{Y}_r(\lambda)$ and $\overline{Z}_r(\lambda)$, wherein $$\overline{X}_r = \frac{\int_0^\infty S_A(\lambda)\overline{X}s(\lambda)d\lambda}{\int_0^\infty S_A(\lambda)Xr(\lambda)d\lambda} \times Xr(\lambda),$$

$$\overline{Y}_r = \frac{\int_0^\infty S_A(\lambda)\overline{Y}s(\lambda)d\lambda}{\int_0^\infty S_A(\lambda)Yr(\lambda)d\lambda} \times Yr(\lambda),$$

$$\overline{Z}_r = \frac{\int_0^\infty S_A(\lambda)\overline{Z}s(\lambda)d\lambda}{\int_0^\infty S_A(\lambda)Zr(\lambda)d\lambda} \times Zr(\lambda).$$

To be noticed, the normalizations of the actual color-matching functions Xr(λ), Yr(λ) and Zr(λ) are based on correcting or reducing the differences between the actual color-matching functions and the standard color-matching functions ($\overline{X}_S(\lambda)$, $\overline{Y}_S(\lambda)$, $\overline{Z}_S(\lambda)$). If the differences can be accepted or bases on other reasons, the normalizations can be passed.

As shown in step S104, a plurality of look-up stimulus values $\overline{X}_{idx}$, $\overline{Y}_{idx}$ and $\overline{Z}_{idx}$ will be obtained according to the spectrum parameters λ0 and Δλf of the light spectrum model St(λ, λ$_0$, Δλ) and actual color-matching functions $\overline{X}_r(\lambda)$, $\overline{Y}_r(\lambda)$ and $\overline{Z}_r(\lambda)$ which corresponds to the different λ0 and the different Δλ.f. Then, calculating the look-up color coordinates $x_{idx}$ and $y_{idx}$, wherein $$\overline{X}_{idx} = \int_0^\infty St(\lambda, \lambda_0, \Delta\lambda)\overline{X}r(\lambda)d\lambda,$$

$$\overline{Y}_{idx} = \int_0^\infty St(\lambda, \lambda_0, \Delta\lambda)\overline{Y}_r(\lambda)d\lambda,$$

$$\overline{Z}_{idx} = \int_0^\infty St(\lambda, \lambda_0, \Delta\lambda)\overline{Z}_r(\lambda)d\lambda,$$

$$x_{idx} = \frac{\overline{X}_{idx}}{\overline{X}_{idx} + \overline{Y}_{idx} + \overline{Z}_{idx}};$$

$$y_{idx} = \frac{\overline{Y}_{idx}}{\overline{X}_{idx} + \overline{Y}_{idx} + \overline{Z}_{idx}}.$$

Please refer to FIG. 12. FIG. 12 illustrates a look-up table with look-up color coordinates corresponds to spectrum parameters of a light-measuring method. According to the said calculations, the look-up table 126 is shown in FIG. 12.

To be supplemented, although the effect of the spectral amplitude has not been considered in the formula of the look-up stimulus values $\overline{X}_{idx}$, $\overline{Y}_{idx}$ and $\overline{Z}_{idx}$, the look-up color coordinate $x_{idx}$ and $y_{idx}$ are dimensionless, so the calculations of the look-up color coordinate $x_{idx}$ and $y_{idx}$ will not be affected. That is to say, the look-up table 126 can be constructed without the spectral amplitude of the to-be-measured light 3. Additionally, the method of constructing the look-up table 126 is implemented for the single, specific light-measuring system 1, but if the light-measuring system 1 will be manufactured in large scale, the same look-up table 126 can be implemented. The range and the interval of the spectrum parameters $\lambda_0$ and $\Delta\lambda_f$ depends on the accuracy of the color coordinate of the to-be-measured light 3.

For example, the ranges of the look-up color coordinate $x_{idx}$ and $y_{idx}$ are $0 \leq x_{idx} \leq 0.73$ and $0 \leq y_{idx} \leq 0.83$. If the color coordinate shall be obtained with an accuracy of 0.001, the amount of corresponding spectrum parameters $\lambda_0$ and $\Delta\lambda_f$ are about $3 \times 10^5$ (($\frac{1}{2}$)×(0.73/0.001)×(0.83/0.001)≈$3 \times 10^5$)). However, the half-power full waviness width variable of the LED is about 50 nm ($\frac{1}{7}$ of the waviness width of the visible ray), so the amount of spectrum parameters $\lambda_0$ and $\Delta\lambda_f$ are $5 \times 10^4$. For example, if the central wave length of the LED ranges from 400 nm to 700 nm, the half-power full waviness width ranges from 20 nm to 50 nm, when the variable interval of the central wave length $\lambda_0$ is equal to 0.25 nm, the variable interval of the full waviness width $\Delta\lambda_f$ is equal to 0.5 nm, the look-up table 126 will be constructed with $8 \times 10^4$ ((350/0.25)×(30/0.5)≈$8 \times 10^4$) spectrum parameters $\lambda_0$ and $\Delta\lambda_f$ which is larger than $5 \times 10^4$. That is to say, the look-up table 126 can be constructed with an accuracy which is larger than 0.001. If the more accurate color coordinate is obtained, the variable intervals of the central wave length $\lambda_0$ and the full waviness width $\Delta\lambda_f$ shall be decreased.

Figure 4:
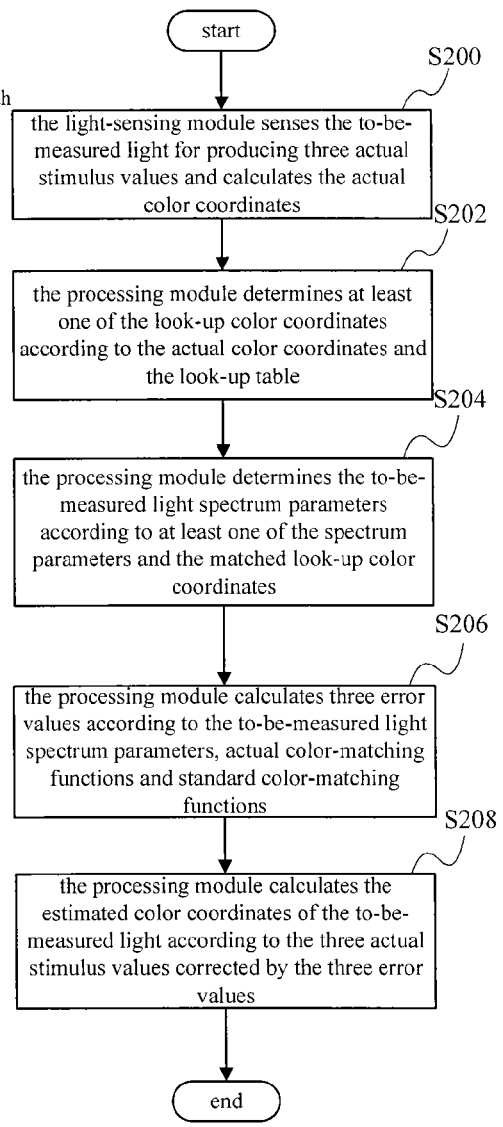
FIG. 4 illustrates a flow chart of a light-measuring method according to a first preferred embodiment of the invention.

Please refer to FIG. 4. FIG. 4 illustrates a flow chart of a light-measuring method according to a first preferred embodiment of the invention. According to the first preferred embodiment of the invention, the light-sensing module 14 senses a light emitted from the to-be-measured light 3. The light is filtrated by the light filtration element 142. Then, the light-sensing element 144 absorbs the light and produces a photoelectric conversion signal, the processing module 122 will produces three actual stimulus values $X_M$, $Y_M$ and $Z_M$. As shown in step S200, the processing module 122 further calculates the corresponding actual color coordinate $x_M$ and $y_M$. Wherein, the relationships of the actual color coordinates and the stimulus values are:

$$x_M = \frac{X_M}{X_M + Y_M + Z_M},$$

$$y_M = \frac{Y_M}{X_M + Y_M + Z_M}.$$

Then, as shown in step S200, the processing module 122 determines at least one of the look-up color coordinates $x_{idx}$ and $y_{idx}$ of the matched actual color coordinate $x_M$ and $y_M$ according to the actual color coordinate $x_M$, $y_M$ and look-up table 126. Then, as shown in step S204, the processing module 122 determines the to-be-measured light spectrum parameters $\lambda_0^*$ and $\Delta\lambda_f^*$ according to at least one of the spectrum parameters $\lambda_0$ and $\Delta\lambda_f$ of the matched look-up color coordinate $x_{idx}$ and $y_{idx}$. The to-be-measured light spectrum parameters $\lambda_0^*$ and $\Delta\lambda_f^*$ can be represented as the spectral feature of the to-be-measured light 3. That is to say, the to-be-measured light 3 can be represented as the light spectrum $AsSt(\lambda, \lambda_0^*, \Delta\lambda_f^*)$, wherein As is the spectral amplitude of the to-be-measured light 3.

To be supplemented, the value of the matched result can be different. If the expected difference value compared to the look-up color coordinate $x_{idx}$ and $y_{idx}$ can be accepted, the result can match with the look-up color coordinate $x_{idx}$ and $y_{idx}$. That is to say, each look-up color coordinate $x_{idx}$ and $y_{idx}$ has a certain coverage, if the actual color coordinate $x_M$ and $y_M$ is located in a certain coverage of look-up color coordinate $x_{idx}$ and $y_{idx}$, the actual color coordinate can be thought that locates between two look-up color coordinate $x_{idx}$ and $y_{idx}$ or matches with the two look-up color coordinate $x_{idx}$ and $y_{idx}$. At least one of the look-up color coordinate $x_{idx}$ and $y_{idx}$ will become a basis of determining the to-be-measured light spectrum parameters $\lambda_0^*$ and $\Delta\lambda_f^*$ in step S204. That is to say, the look-up color coordinate $x_{idx}$ and $y_{idx}$ shall be determined in step S202. Additionally, the look-up color coordinate $x_{idx}$ and $y_{idx}$ can be thought that matches with the actual color coordinate $x_M$ and $y_M$.

For example, if the actual color coordinate $x_M$ and $y_M$ locates between the look-up color coordinate $x_2$, $y_2$ and look-up color coordinate $x_3$, $y_3$ in FIG. 12. That is to say, the $x_M$ locates between $x_2$ and $x_3$, $y_M$ locates between $y_2$ and $y_3$. The look-up color coordinate $x_2$, $y_2$ and $x_3$, $y_3$ are separately corresponded to the spectrum parameters $\lambda_2$ and $\Delta\lambda_2$ and spectrum parameters $\lambda_3$ and $\Delta\lambda_3$. The spectrum parameters of the corresponding actual color coordinate $x_M$ and $y_M$ are determined by linear interpolation. The formula of the to-be-measured light spectrum parameters $\lambda_0^*$ and $\Delta\lambda_f^*$ are:

$$\lambda_0^* = \frac{\sqrt{(x_M - x_3)^2 + (y_M - y_3)^2}}{\sqrt{(x_2 - x_3)^2 + (y_2 - y_3)^2}} \times (\lambda_2 - \lambda_3) + \lambda_3,$$

$$\Delta\lambda_r^* = \frac{\sqrt{(x_M - x_3)^2 + (y_M - y_3)^2}}{\sqrt{(x_2 - x_3)^2 + (y_2 - y_3)^2}} \times (\Delta\lambda_2 - \Delta\lambda_3) + \Delta\lambda_3.$$

Of cause, the invention can be, but not limited to linear interpolation. The look-up color coordinates $x_2$, $y_2$, $x_3$ and $y_3$ can be thought as matched actual color coordinate $x_M$ and $y_M$. In principle, if the sampling intervals of the look-up color coordinate $x_{idx}$ and $y_{idx}$ are small, the linear interpolation will be accurate.

Please refer to FIG. 4. As shown in step S206, the processing module 122 calculates three error values $\Delta X$, $\Delta Y$ and $\Delta Z$ according to the to-be-measured light spectrum parameters $\lambda_0^*$, $\Delta\lambda_f^*$, actual color-matching functions $\overline{X}_r(\lambda)$, $\overline{Y}_r(\lambda)$, $\overline{Z}_r(\lambda)$ and standard color-matching functions $\overline{X}_S(\lambda)$, $\overline{Y}_S(\lambda)$, $\overline{Z}_S(\lambda)$. The formulas are:

$$\Delta X \equiv X_{MS} - X_{SIM} = \int_0^\infty AsSt(\lambda, \lambda_0^*, \Delta\lambda_f^*) \times (\overline{X}_S(\lambda) - \overline{X}_r(\lambda)) d\lambda,$$

$$\Delta Y \equiv Y_{MS} - Y_{SIM} = \int_0^\infty AsSt(\lambda, \lambda_0^*, \Delta\lambda_f^*) \times (\overline{Y}_S(\lambda) - \overline{Y}_r(\lambda)) d\lambda,$$

$$\Delta Z \equiv Z_{MS} - Z_{SIM} = \int_0^\infty AsSt(\lambda, \lambda_0^*, \Delta\lambda_f^*) \times (\overline{Z}_S(\lambda) - \overline{Z}_r(\lambda)) d\lambda,$$

$$\text{wherein } As = X_M \bigg/ \int_0^\infty St(\lambda, \lambda_0^*, \Delta\lambda_f^*) \overline{X}_r(\lambda) d\lambda.$$

$X_{MS}$, $Y_{MS}$ and $Z_{MS}$ are standard stimulus values of the standard color-matching functions $\overline{X}_S(\lambda)$, $\overline{Y}_S(\lambda)$ and $\overline{Z}_S(\lambda)$ stimulus light spectrum AsSt($\lambda$, $\lambda_0^*$, $\Delta\lambda_f^*$) according to the to-be-measured light spectrum parameters $\lambda_0^*$ 及 $\Delta\lambda_f^*$. $X_{SIM}$, $Y_{SIM}$ and $Z_{SIM}$ are analogue stimulus values of the actual color-matching functions $\overline{X}_r(\lambda)$, $\overline{Y}_r(\lambda)$ and $\overline{Z}_r(\lambda)$ stimulus light spectrum AsSt($\lambda$, $\lambda_0^*$, $\Delta\lambda_f^*$). Additionally, the spectral amplitude As can be obtained by integrating $Y_M/\overline{Y}_r(\lambda)$ or $Z_M/\overline{Z}_r(\lambda)$. The As calculated by said three way will be different, but As can be determined by the average value.

Thus, as shown in step S208, the processing module 122 calculates the estimated color coordinate $x_{EST}$, $y_{EST}$ and $z_{EST}$ of the to-be-measured light 3 according to the three actual stimulus values $X_M$, $Y_M$ and $Z_M$ corrected by the three values $\Delta X$, $\Delta Y$ and $\Delta Z$. The formulas are:

$$x_{EST} = (X_M + \Delta X)/(X_M + \Delta X + Y_M + \Delta Y + Z_M + \Delta Z);$$

$$y_{EST} = (Y_M + \Delta Y)/(X_M + \Delta X + Y_M + \Delta Y + Z_M + \Delta Z);$$

$$z_{EST} = (Z_M + \Delta Z)/(X_M + \Delta X + Y_M + \Delta Y + Z_M + \Delta Z)_o$$

The estimated color coordinate $x_{EST}$, $y_{EST}$ and $z_{EST}$ is the measuring result of the color coordinate of the light-measuring system 1. Additionally, in step S206, if the three are defined as $\Delta\overline{X}$, $\Delta\overline{Y}$ and $\Delta\overline{Z}$:

$$\Delta\overline{X} = \int_0^\infty St(\lambda, \lambda_0^*, \Delta\lambda_f^*) \times (\overline{X}_S(\lambda) - \overline{X}_r(\lambda)) d\lambda,$$

$$\Delta\overline{Y} = \int_0^\infty St(\lambda, \lambda_0^*, \Delta\lambda_f^*) \times (\overline{Y}_S(\lambda) - \overline{Y}_r(\lambda)) d\lambda,$$

$$\Delta\overline{Z} = \int_0^\infty St(\lambda, \lambda_0^*, \Delta\lambda_f^*) \times (\overline{Z}_S(\lambda) - \overline{Z}_r(\lambda)) d\lambda.$$

In step S208, the estimated color coordinates $x_{EST}$, $y_{EST}$ and $z_{EST}$ of the to-be-measured light 3 can be obtained by the following formulas:

$$x_{EST} = \left(\frac{X_M}{A_S} + \Delta\overline{X}\right) \Big/ \left(\frac{X_M}{A_S} + \Delta\overline{X} + \frac{Y_M}{A_S} + \Delta\overline{Y} + \frac{Z_M}{A_S} + \Delta\overline{Z}\right),$$

$$y_{EST} = \left(\frac{Y_M}{A_S} + \Delta\overline{Y}\right) \Big/ \left(\frac{X_M}{A_S} + \Delta\overline{X} + \frac{Y_M}{A_S} + \Delta\overline{Y} + \frac{Z_M}{A_S} + \Delta\overline{Z}\right),$$

$$z_{EST} = \left(\frac{Z_M}{A_S} + \Delta\overline{X}\right) \Big/ \left(\frac{X_M}{A_S} + \Delta\overline{X} + \frac{Y_M}{A_S} + \Delta\overline{Y} + \frac{Z_M}{A_S} + \Delta\overline{Z}\right).$$

Please refer to FIG. 13. FIG. 13 illustrates a look-up table with error corrected parameters corresponding to spectrum parameters of a light-measuring method. Because the error values $\Delta\overline{X}$, $\Delta\overline{Y}$ and $\Delta\overline{Z}$ do not relative to the spectral amplitude As of the to-be-measured light, a error corrected parameter can be calculated in advance according to the different spectrum parameters $\lambda_0$ and $\Delta\lambda_f$ correspondingly. The error corrected parameters can be integrated into the look-up table 126, as shown in FIG. 13.

The $\Delta\overline{X}_1$, $\Delta\overline{Y}_1$, $\Delta\overline{Z}_1$, ..., $\Delta\overline{Z}_4$ are the reference error values, the formulas of the $\Delta\overline{X}_1$, $\Delta\overline{Y}_1$, $\Delta\overline{Z}_1$, ..., $\Delta\overline{Z}_4$ and the formulas of the $\Delta\overline{X}$, $\Delta\overline{Y}$ and $\Delta\overline{Z}$ are the same. However, the calculation is corresponded to the light spectrum model St($\lambda$, $\lambda_0$, $\Delta\lambda$) of the different spectrum parameters $\lambda_0$ and $\Delta\lambda_f$ without the light spectrum model St($\lambda$, $\lambda_0^*$, $\Delta\lambda_f^*$) of the specific to-be-measured light spectrum parameters $\lambda_0^*$, $\Delta\lambda_f^*$. The embodiment of the calculation can be integrated in step S104, and it will no longer be explained. By using the look-up table 126 and the logic of determining the to-be-measured light spectrum parameters $\lambda_0^*$ and $\Delta\lambda_f^*$, in step S204, the processing module 122 determines the three error values $\Delta\overline{X}$, $\Delta\overline{Y}$ and $\Delta\overline{Z}$ according to at least one of the error corrected parameters of at least one of the matched spectrum parameters $\lambda_0$ and $\Delta\lambda_f$. The three error values $\Delta\overline{X}$, $\Delta\overline{Y}$ and $\Delta\overline{Z}$ are the basis of correcting the actual stimulus values $X_M$, $Y_M$ and $Z_M$. Then, the processing module 122 calculates the estimated color coordinates $x_{EST}$, $y_{EST}$ and $z_{EST}$ of the to-be-measured light 3.

Figures 5, 6:
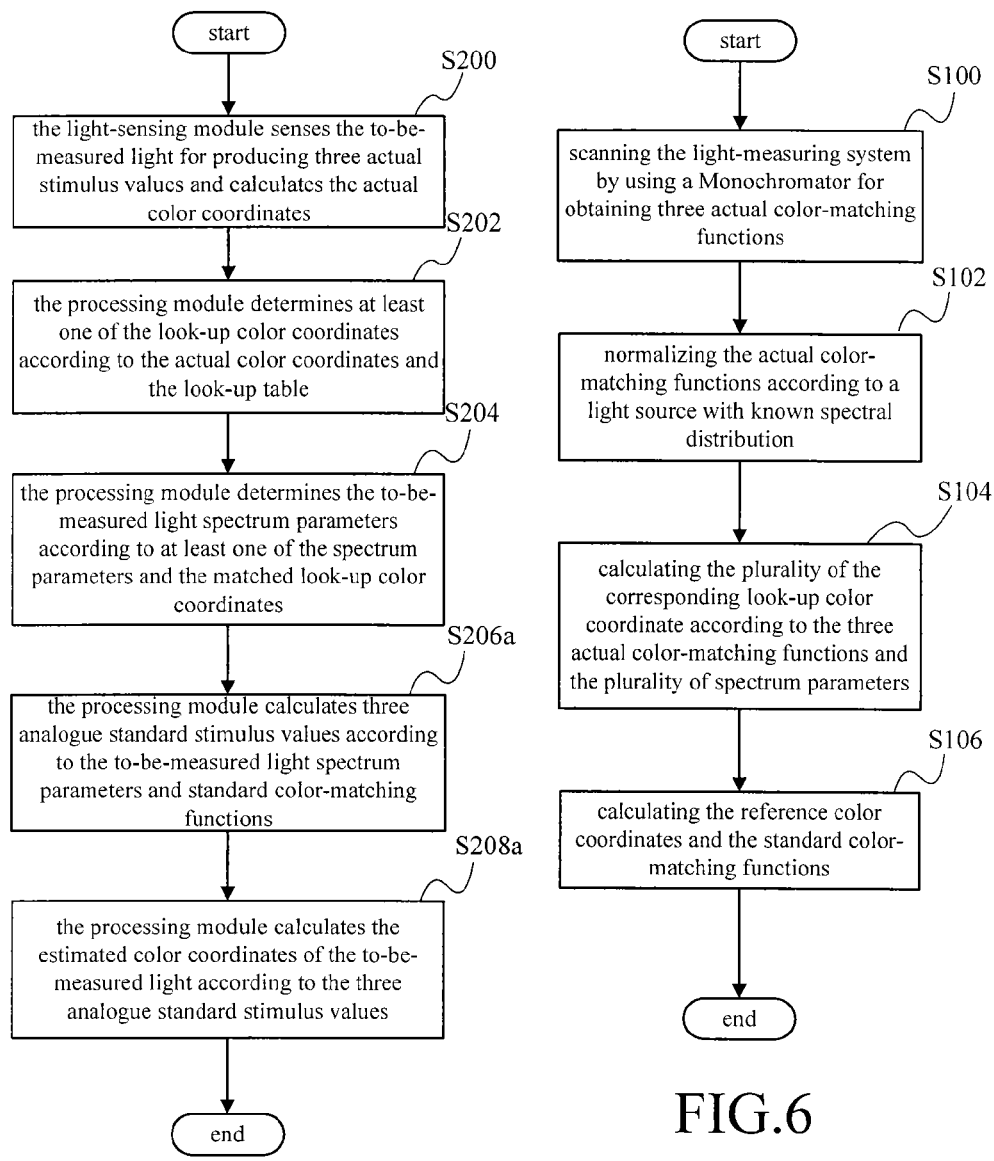
FIG. 5 illustrates a flow chart of a light-measuring method according to a second preferred embodiment of the invention.
FIG. 6 illustrates a flow chart of a method of constructing light-measuring look-up table according to a third preferred embodiment of the invention.

According to the first preferred embodiment of the invention, the light-measuring system 1 uses the stimulus light spectrum AsSt($\lambda$, $\lambda_0^*$, $\Delta\lambda_f^*$) (or St($\lambda$, $\lambda_0^*$, $\Delta\lambda_f^*$) calculated with the actual color-matching functions $\overline{X}_r(\lambda)$, $\overline{Y}_r(\lambda)$ $\overline{Z}_r(\lambda)$, standard color-matching functions $\overline{X}_S(\lambda)$, $\overline{Y}_S(\lambda)$ and $\overline{Z}_S(\lambda)$ to form the error values $\Delta\overline{X}$, $\Delta\overline{Y}$ and $\Delta\overline{Z}$, for correcting the actual stimulus values $X_M$, $Y_M$ and $Z_M$. Furthermore, the estimated color coordinates $x_{EST}$, $y_{EST}$ and $z_{EST}$ will be obtained. Please refer to FIG. 4 and FIG. 5. FIG. 5 illustrates a flow chart of a light-measuring method according to a second preferred embodiment of the invention. Compared to the first preferred embodiment of the invention, the light-measuring method of the second preferred embodiment of the invention is that the processing module 122 determines the to-be-measured light spectrum parameters $\lambda_0^*$ and $\Delta\lambda_f^*$, then the processing module 122 directly calculates three analogue standard stimulus values $\overline{X}_{MS}$, $\overline{Y}_{MS}$ and $\overline{Z}_{MS}$ according to the to-be-measured light spectrum parameters $\lambda_0^*$ and $\Delta\lambda_f^*$ and the standard color-matching functions $\overline{X}_S(\lambda)$, $\overline{Y}_S(\lambda)$ and $\overline{Z}_S(\lambda)$. As shown in step S206a, the formulas are:

$$\overline{X}_{MS} = \int_0^\infty St(\lambda, \lambda_0^*, \Delta\lambda_f^*) \overline{X}_S(\lambda) d\lambda,$$

$$\overline{Y}_{MS} = \int_0^\infty St(\lambda, \lambda_0^*, \Delta\lambda_f^*) \overline{Y}_S(\lambda) d\lambda,$$

$$\overline{Z}_{MS} = \int_0^\infty St(\lambda, \lambda_0^*, \Delta\lambda_f^*) \overline{Z}_S(\lambda) d\lambda.$$

The processing module 122 further calculates the estimated color coordinate $x_{EST}$, $y_{EST}$ and $z_{EST}$ according to the analogue standard stimulus values $\overline{X}_{MS}$, $\overline{Y}_{MS}$ and $\overline{Z}_{MS}$. As shown in step S208a, the formulas are:

$$x_{EST} = \frac{\overline{X}_{MS}}{\overline{X}_{MS} + \overline{Y}_{MS} + \overline{Z}_{MS}},$$

$$y_{EST} = \frac{\overline{Y}_{MS}}{\overline{X}_{MS} + \overline{Y}_{MS} + \overline{Z}_{MS}},$$

$$z_{EST} = \frac{\overline{Z}_{MS}}{\overline{X}_{MS} + \overline{Y}_{MS} + \overline{Z}_{MS}}.$$

To be supplemented, the calculating ways in step S208a are different from the ways in step S208, but the formulas are all represented as the estimated color coordinate $x_{EST}$, $y_{EST}$ and $z_{EST}$ of the to-be-measured light 3, so that the $x_{EST}$, $y_{EST}$ and $z_{EST}$ are represented as the same symbol. Additionally, because the estimated color coordinates $x_{EST}$, $y_{EST}$ and $z_{EST}$ are dimensionless, the estimated color coordinates $x_{EST}$, $y_{EST}$ and $z_{EST}$ can be calculated by the said analogue standard stimulus values $\overline{X}_{MS}$, $\overline{Y}_{MS}$ and $\overline{Z}_{MS}$ without the spectral amplitude As. That is to say, the reference color coordinates $x_{ref}$ and $y_{ref}$ can be calculated in advance for obtaining the estimated color coordinates $x_{EST}$, $y_{EST}$ and $z_{EST}$.

Please refer to FIG. 6. FIG. 6 illustrates a flow chart of a method of constructing light-measuring look-up table according to a third preferred embodiment of the invention. Compared to the FIG. 3, the look-up table 126 further comprises the plurality of reference color coordinates $x_{ref}$ and $y_{ref}$. Each reference color coordinate $x_{ref}$ and $y_{ref}$ is corresponded to one of the spectrum parameters $\lambda_0$ and $\Delta\lambda_f$. In the other words, each reference color coordinate $x_{ref}$ and $y_{ref}$ is corresponded to one of the look-up color coordinates $x_{idx}$ and $y_{idx}$. As shown in step S106, the method of constructing the light-measuring look-up table further comprises a step of calculating three reference standard stimulus values $\overline{X}_{ref}$, $\overline{Y}_{ref}$ and $\overline{Z}_{ref}$ according to the $\overline{X}_S(\lambda)$, $\overline{Y}_S(\lambda)$ and $\overline{Z}_S(\lambda)$ corresponding to each spectrum parameters $\lambda_0$ and $\Delta\lambda_f$. Then, the reference color coordinate $x_{ref}$ and $y_{ref}$ can be obtained. The formulas are:

$$\overline{X}_{ref} = \int_0^\infty St(\lambda, \lambda_0, \Delta\lambda_f)\overline{X}_S(\lambda)d\lambda,$$

$$\overline{Y}_{ref} = \int_0^\infty St(\lambda, \lambda_0, \Delta\lambda_f)\overline{Y}_S(\lambda)d\lambda,$$

$$\overline{Z}_{ref} = \int_0^\infty St(\lambda, \lambda_0, \Delta\lambda_f)\overline{Z}_S(\lambda)d\lambda,$$

$$x_{ref} = \frac{\overline{X}_{ref}}{\overline{X}_{ref} + \overline{Y}_{ref} + \overline{Z}_{ref}},$$

$$y_{ref} = \frac{\overline{Y}_{ref}}{\overline{X}_{ref} + \overline{Y}_{ref} + \overline{Z}_{ref}}.$$

Please refer to FIG. 14. FIG. 14 illustrates a look-up table with reference color coordinates corresponding to the spectrum parameters of a light-measuring method. According to the said formulas, the look-up table 126 can be shown in FIG. 14.

Figure 7:
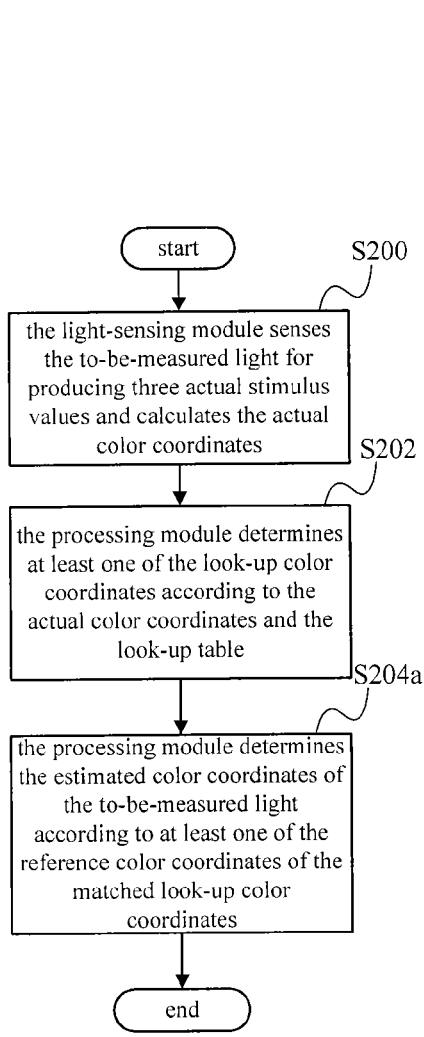
FIG. 7 illustrates a flow chart of a light-measuring method according to a third preferred embodiment of the invention.

Please refer to FIG. 4 and FIG. 7. FIG. 7 illustrates a flow chart of a light-measuring method according to a third preferred embodiment of the invention. Compared to the first preferred embodiment of the invention, the light-measuring method of the third preferred embodiment of the invention is that the processing module 122 directly determines the estimated color coordinates $x_{EST}$, $y_{EST}$ and $z_{EST}$ of the to-be-measured light 3 according to at least one of the reference color coordinates $x_{ref}$ and $y_{ref}$ of the matched look-up color coordinates $x_{idx}$ and $y_{idx}$ in step S204. The logics of determining the to-be-measured light spectrum parameters $\lambda_0^*$ and $\Delta\lambda_f^*$ in the step S204 are the same as the logics of determining the estimated color coordinates $x_{EST}$, $y_{EST}$ and $z_{EST}$ in step S204a, and it will no longer be explained. To be supplemented, although the estimated color coordinates) $x_{EST}$, $y_{EST}$ and $z_{EST}$ can be determined without the to-be-measured light spectrum parameters $\lambda_0^*$ and $\Delta\lambda_f^*$ so that the look-up table 126 can be shown without the spectrum parameters $\lambda_0$ and $\Delta\lambda_f$. However, when determining the estimated luminance $I_{EST}$ of the to-be-measured light 3, the to-be-measured light spectrum parameters $\lambda_0^*$ and $\Delta\lambda_f^*$ shall be obtained. So that, the relationship of the spectrum parameters, look-up color coordinates and reference color coordinates is shown in FIG. 14.

Figure 8:
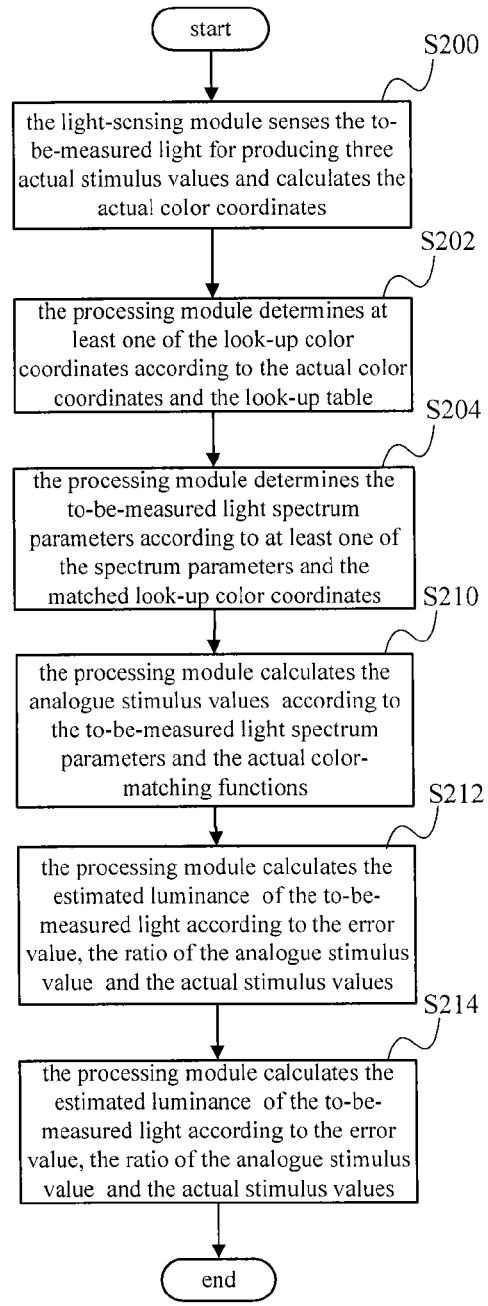
FIG. 8 illustrates a flow chart of a light-measuring method according to a first preferred embodiment of the invention.

Please refer to FIG. 8. FIG. 8 illustrates a flow chart of a light-measuring method according to a first preferred embodiment of the invention. Because the color coordinates and the luminance can be processed separately, the flow chart of the estimated luminance $I_{EST}$ is shown in FIG. 8 merely. After step S204, the actual stimulus values $X_M$, $Y_M$, $Z_M$, to-be-measured light spectrum parameters $\lambda_0^*$, $\Delta\lambda_f^*$ (or analogue light spectrum $St(\lambda, \lambda_0^*, \Delta\lambda_f^*)$) and the values produced in the calculation. For example, the error values $\Delta X$, $\Delta Y$, $\Delta Z$ (or $\Delta\overline{X}$, $\Delta\overline{Y}$, $\Delta\overline{Z}$) or spectral amplitude As are different according the measuring ways of the color coordinates. According to the CIE 1931, the luminance is defined as the integration of the standard color-matching functions $\overline{Y}_S(\lambda)$ and the to-be-measured light. Accordingly, the light-measuring method further comprises a step of calculating the analogue stimulus values $\overline{Y}_{SIM}$ by the processing module 122, according to the to-be-measured light spectrum parameters $\lambda_0^*$, $\Delta\lambda_f^*$ and the actual color-matching functions $\overline{Y}_r(\lambda)$ corresponding to the standard color-matching functions $\overline{Y}_S(\lambda)$. As shown in step S210, the formula is:

$$\overline{Y}_{SIM} = \int_0^\infty St(\lambda, \lambda_0^*, \Delta\lambda_f^*)\overline{Y}_r(\lambda)d\lambda.$$

As shown in step S212, the processing module 122 calculates the error values $\Delta\overline{Y}$ according to the to-be-measured light spectrum parameters $\lambda_0^*$, $\Delta\lambda_f^*$, the actual color-matching functions $\overline{Y}_r(\lambda)$ and the standard color-matching functions $\overline{Y}_S(\lambda)$. The formula is shown in step S214, $$\Delta\overline{Y} = \int_0^\infty St(\lambda, \lambda_0^*, \Delta\lambda_f^*) \times (\overline{Y}_S(\lambda) - \overline{Y}_r(\lambda))d\lambda.$$

Then, as shown in S214, the processing module 122 calculates the estimated luminance $I_{EST}$ of the to-be-measured light 3 according to the error values $\Delta\overline{Y}$, the ratio of the analogue stimulus value $\overline{Y}_{SIM}$ and the actual stimulus values $Y_M$. The formula is:

$$I_{EST} = Y_M \times (1\Delta\overline{Y}/\overline{Y}_{SIM}).$$

Please refer to FIG. 15. FIG. 15 illustrates a look-up table with error corrected parameters corresponding to spectrum parameters of a light-measuring method. The error values $\Delta\overline{Y}$ do not relate to the spectral amplitude As, so that the reference error values can be calculated according to each spectrum parameters $\lambda_0$ and $\Delta\lambda_f$ in advance and shown in look-up table 126.

According to the look-up table 126, in step S212, the processing module 122 determines error values $\Delta\overline{Y}$ according to at least one of the error values of at least one of the matched spectrum parameters $\lambda_0$ and $\Delta\lambda_f$. Compared to the FIG. 13 and FIG. 15, the reference error values in FIG. 15 are the reference error values in the FIG. 13, so FIG. 15 can be integrated into FIG. 13. When calculating the estimated luminance $I_{EST}$, if the analogue stimulus values $\overline{Y}_{SIM}$ can be calculated, the estimated luminance $I_{EST}$ can be obtained easily.

Please refer to FIG. 16. FIG. 16 illustrates a look-up table with reference ratios corresponding to spectrum parameters of a light-measuring method. Additionally, the analogue stimulus values $\overline{Y}_{SIM}$ do not relate to the spectral amplitude As, so that the reference ratios $\gamma \equiv \Delta\overline{Y}/\overline{Y}_{SIM}$ can be calculated according to the error values $\Delta\overline{Y}$ and each spectrum parameters $\lambda_0$ and $\Delta\lambda_f$ in advance, and shown in look-up table 126.

By using the logic of determining the to-be-measured light spectrum parameters $\lambda_0^*$ and $\Delta\lambda_f^*$, the processing module 122 determines a specific ratio according to at least one of the reference ratios of at least one of the matched spectrum parameters $\lambda_0$ and $\Delta\lambda_f$. So the estimated luminance $I_{EST}$ can be represented as $I_{EST} = Y_M \times (1+\gamma^*)$.

Please refer to FIG. 17. FIG. 17 illustrates a look-up table with reference adjustment coefficients corresponding to spectrum parameters of a light-measuring method. Furthermore, if $(1+\gamma^*)$ can be thought as a specific adjustment coefficient $k^*$, the estimated luminance $I_{EST}$ can be simplified as $I_{EST}=Y_M \times k^*$. Similarly, the reference adjustment coefficients k can be calculated in advance corresponding to each spectrum parameters $\lambda_0$, $\Delta\lambda_f$ and shown in the look-up table 126. Similarly, by using the logic of determining the to-be-measured light spectrum parameters $\lambda_0^*$ and $\Delta\lambda_f^*$, the processing module 122 determines an adjustment coefficient k* according to at least one of the reference adjustment coefficients k of at least one of the matched spectrum parameters $\lambda_0$ and $\Delta\lambda_f$. Then, the estimated luminance $I_{EST}$ can be obtained.

Figures 9, 10:
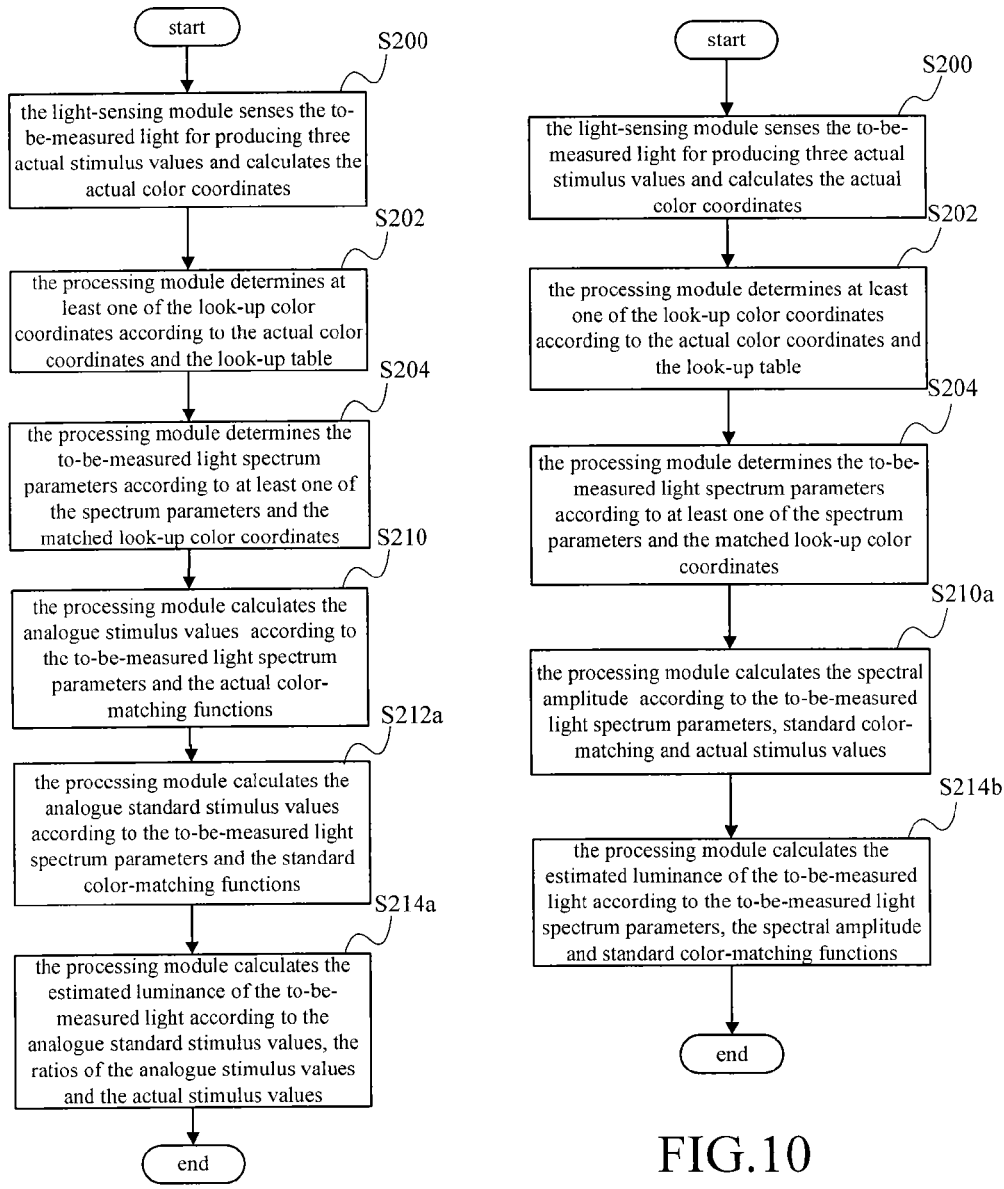
FIG. 9 illustrates a flow chart of a light-measuring method according to another preferred embodiment of the invention.
FIG. 10 illustrates a flow chart of a light-measuring method according to a fourth preferred embodiment of the invention.

Please refer to FIG. 9. FIG. 9 illustrates a flow chart of a light-measuring method according to another preferred embodiment of the invention. Compared to the FIG. 8, the processing module 122 dose not calculate the said error values $\Delta\overline{Y}$. In step S212a, the processing module 122 directly calculates the analogue standard stimulus values $\overline{Y}_{MS}$ (the formula is shown in step S206a, $$\overline{Y}_{MS} = \int_0^\infty St(\lambda, \lambda_0^*, \Delta\lambda_f^*)\overline{Y}_S(\lambda)d\lambda\Big).$$

In step S214a, the processing module 122 calculates the estimated luminance $I_{EST}$ of the to-be-measured light 3 according to the analogue standard stimulus values $\overline{Y}_{MS}$, the ratios of the analogue stimulus values $\overline{Y}_{SIM}$ and the actual stimulus values $Y_M$. The formula is:

$$I_{EST}=Y_M \times (\overline{Y}_{MS}/\overline{Y}_{SIM}).$$

Analogue standard stimulus values $\overline{Y}_{MS}$ do not relate to the spectral amplitude As, so that the ratios can be calculated according to the spectrum parameters $\lambda_0$ and $\Delta\lambda_f$ in advance, and shown in the look-up table 126. In fact, $k^* \equiv (1+\gamma^*)=(1+\Delta\overline{Y}/\overline{Y}_{SIM})=(\overline{Y}_{SIM}+\Delta\overline{Y})/\overline{Y}_{SIM}=\overline{Y}_{MS}/\overline{Y}_{SIM}$. So that, the reference standard stimulus values $\overline{Y}_{ref}$ and the reference stimulus values (the look-up stimulus values $\overline{Y}_{idx}$) can be calculated corresponding to each spectrum parameters $\lambda_0$ and $\Delta\lambda_f$ (as shown in step S106, $$\overline{Y}_{ref} = \int_0^\infty St(\lambda, \lambda_0, \Delta\lambda_f)\overline{Y}_S(\lambda)d\lambda\Big).$$

and reference stimulus values. Then, the ratios (reference adjustment coefficients k) can be integrated into the look-up table 126, as shown in FIG. 17. The way of determining the specific ratios (adjustment coefficients k*) and calculating the estimated luminance $I_{EST}$ are mentioned, and it will no longer be explained.

Please refer to FIG. 10. FIG. 10 illustrates a flow chart of a light-measuring method according to a fourth preferred embodiment of the invention. Compared to the FIG. 9, instead of correcting the actual stimulus values $Y_M$, the light-measuring method in FIG. 10 is to determine the spectral amplitude As of the to-be-measured light 3. In step S210a and S214b, the estimated luminance $I_{EST}$ can be obtained according to the to-be-measured light spectrum parameters $\lambda_0^*$, $\Delta\lambda_f^*$ and standard color-matching functions.

In details, the analogue stimulus values $Y_{SIM}$ about the analogue light spectrum $AsSt(\lambda, \lambda_0^*, \Delta\lambda_f^*)$ can be constructed according to the to-be-measured light spectrum parameters $\lambda_0^*$ and $\Delta\lambda_f^*$. The formula is:

$$Y_{SIM} = \int_0^\infty AsSt(\lambda, \lambda_0^*, \Delta\lambda_f^*)\overline{Y}_r(\lambda)d\lambda_o$$

Because the light spectrum model $St(\lambda, \lambda_0, \Delta\lambda)$ is constructed according to the to-be-measured light 3, the light spectrum model $St(\lambda, \lambda_0, \Delta\lambda)$ can be thought as the spectral feature of the actual to-be-measured light 3. Accordingly, the actual stimulus values $Y_M$ can be represented by the analogue stimulus values $Y_{SIM}$. Then, the spectral amplitude As can be obtained by the following formula:

$$As = Y_M \Big/ \int_0^\infty St(\lambda, \lambda_0^*, \Delta\lambda_f^*)\overline{Y}_r(\lambda)d\lambda.$$

Of course, As can be obtained by the integration of the $X_M/\overline{X}_r(\lambda)$ or the integration of the $Z_M/\overline{Z}_r(\lambda)$. The values of As may be different, but the As can be determined by the average value. After obtaining the spectral amplitude As the estimated luminance $I_{EST}$ can be obtained by the following formula:

$$I_{EST} \equiv Y_{MS} = \int_0^\infty AsSt(\lambda, \lambda_0^*, \Delta\lambda_f^*)\overline{Y}_S(\lambda)d\lambda$$

The said embodiments are explained the ways of determining the estimated color coordinates $x_{EST}$, $y_{EST}$, $z_{EST}$ and estimated luminance $I_{EST}$. In practice, the ways of determining the estimated color coordinates can be, but not limited to the said embodiments 之. Additionally, the embodiments take single to-be-measured light for examples, but in practice, the plurality of to-be-measured lights can also be measured at the same time.

Figure 11:
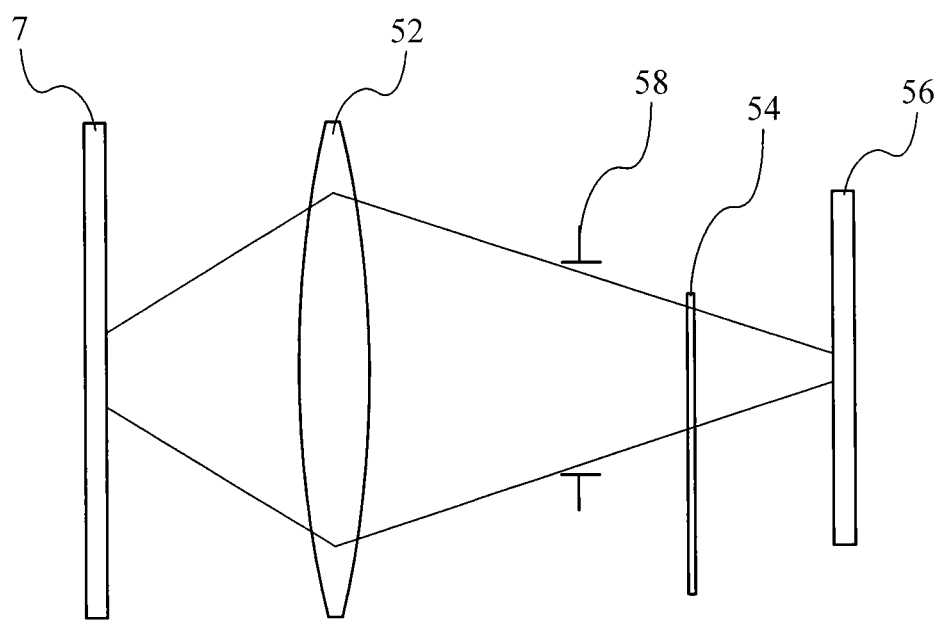
FIG. 11 illustrates a schematic diagram of a light-measuring system according to a fifth preferred embodiment of the invention.

Please refer to FIG. 11. FIG. 11 illustrates a schematic diagram of a light-measuring system according to a fifth preferred embodiment of the invention. The light-measuring system 5 comprises a lens 52, a light filtration turntable 54, an image sensing device (such as a charge-coupled-device (CCD) 56), a processing module (not shown in figures) and a storage module (not shown in figures). The light-measuring system 5 can be used to measure a emitting device which has a plurality of to-be-measured light, such as a liquid-crystal display (LCD) 7. A light emitted by the LCD 7 passes through the lens 52 and filtrated by the light filtration turntable 54. Finally, the images are imaged at the CCD 56. The light filtration turntable 54 comprises four light filters. The spectral responses of the light filters, the lens 52 and the CCD 56 are assembled as the actual color-matching functions $\overline{X}_r(\lambda)$, $\overline{Y}_r(\lambda)$ and $\overline{Z}_r(\lambda)$. Wherein the spectral responses of the light filters, the lens 52 and the CCD 56 are assembled as the actual color-matching functions $\overline{X}_r(\lambda)$. The light-measuring system 5 further comprises an optical shutter 58 for controlling the light to enter or not.

The LCD 7 is set in two-dimension. The images of the plurality of to-be-measured light at the CCD 56 are two-dimensional. The CCD 56, comprises a plurality of light-sensing units (not shown in figures), can sense the light and transmit the photoelectric conversion signal to the processing module. The process of the photoelectric conversion signal (such as actual stimulus values) and the determining process of the estimated color coordinate and the estimated luminance are the same, and it will no longer be explained. Each to-be-measured light of the LED 7 does not correspond to a light-sensing unit necessarily, but each to-be-measured light can be distinguished by pixel processing. Then, the corresponding estimated color coordinate and the estimated luminance can be calculated. In principle, the configuration density of the light-sensing units of the CCD 56 is larger than the configuration density of the to-be-measured light of the LCD 7, so that the plurality of to-be-measured light CCD 56 can provide a high discrimination. That is to say, the light-measuring system 5 can use the method of measuring single light to measure estimated color coordinates and the estimated luminance of the each corresponding light-sensing unit. Furthermore, calculating average color coordinate and the color-profile of each light by a software and obtaining the estimated color coordinates and the estimated luminance of the to-be-measured light.

To be supplemented, the to-be-measured light is set in two-dimension, so that the to-be-measured light can also be set in one-dimension, such as the LED is set along a straight line or a curve. Additionally, although the spectral responses of the light-sensing units are almost the same, the light-sensing units are disposed at different places and affected by the lens 52 and the light filter, so that the photosensitivity of the light-sensing units are different. Thus, the light-measuring system 5 can be calibrated with a flat-field calibration. That is to say, each light-sensing unit can be illuminated by a uniform light to obtain the value of each light-sensing unit. Then, a flat-field calibration coefficient can be produced corresponding to each light-sensing unit to compensate for the difference of the photosensitivity. The flat-field calibration coefficients can form a light-sensing adjusting table and the light-sensing adjusting table can be merged into the look-up table 126. Thus, compensating the photoelectric conversion signal according to the corresponding flat-field calibration coefficients before processing the photoelectric conversion signal. Then, processing the signal and calculating the estimated color coordinate and estimated luminance. Otherwise, processing the photoelectric conversion signal directly and calculating the estimated color coordinate and estimated luminance. The calculation of the estimated luminance shall be corrected by the corresponding flat-field calibration coefficient.

To sum up, the light-measuring system and the light-measuring method can determine the to-be-measured light spectrum parameters, accurate color coordinates and the luminance according to the look-up table constructed by the light spectrum model of the to-be-measured light. Accordingly, the to-be-measured light spectrum parameters, accurate color coordinates and the luminance can be determined by referring table easily and the easy calculating steps. Briefly, the look-up table can be constructed in advance for the known spectral features of the to-be-measured light. The actual measuring system and the standard measuring system can be connected so that the error can be removed. Additionally, the color values can also be measured with high accuracy.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A light-measuring method for measuring a to-be-measured light by a light-measuring system according to a look-up table comprising a plurality of spectrum parameters and a plurality of look-up color coordinates based on a light spectrum model, each look-up color coordinate corresponding to one of the plurality of spectrum parameters, the look-up table further comprising a plurality of error corrected parameters, each error corrected parameter comprises three reference error values and corresponds to one of the plurality of spectrum parameters, the light-measuring method comprising the following steps of:

measuring the to-be-measured light by the light-measuring system, for obtaining actual stimulus values, and then calculating an actual color coordinate;

determining at least one of the look-up color coordinate matched with the actual color coordinate according to the actual color coordinate and the look-up table;

determining a to-be-measured light spectrum parameter according to at least one of the spectrum parameters of at least one of the matched look-up color coordinates;

determining three error values according to at least one of the error corrected parameters of the at least one of the matched spectrum parameters; and correcting the three actual stimulus values according to the three determined error values and calculating an estimated color coordinate of the to-be-measured light.

2. The light-measuring method of claim 1, further comprising the following steps of:

measuring the light-measuring system to obtain three actual color-matching functions; and calculating the plurality of the corresponding look-up color coordinates according to the three actual color-matching functions and the plurality of spectrum parameters.

3. The light-measuring method of claim 2, further comprising the following step of:

normalizing the three actual color-matching functions by a standard light.

4. The light-measuring method of claim 1, wherein the light spectrum model comprises a central wavelength variable and a half-power full waviness width variable.

5. The light-measuring method of claim 1, further comprising the following steps of:

calculating three error values according to the to-be-measured light spectrum parameter, three actual color-matching functions and three standard color-matching functions; and calculating an estimated color coordinate of the to-be-measured light according to the three actual stimulus values corrected by the three error values.

6. The light-measuring method of claim 1, further comprising the following step of:

calculating the plurality of corresponded error corrected parameters according to three actual color-matching functions, three standard color-matching functions and the plurality of spectrum parameters.

7. The light-measuring method of claim 1, wherein the three actual stimulus values are corresponded to three actual color-matching functions of the light-measuring system separately, the light-measuring method further comprises following steps of:

calculating an analogue stimulus value according to the to-be-measured light spectrum parameter and one of the three actual color-matching functions;

calculating an error value according to the to-be-measured light spectrum parameter, a standard color-matching functions and the three actual color-matching functions; and calculating an estimated luminance of the to-be-measured light according to the ratio value of the error values and the analogue stimulus values, and according to the actual stimulus value corresponded to the three actual color-matching function.

8. The light-measuring method of claim 1, wherein the three actual stimulus values are corresponded to the three actual color-matching functions of the light-measuring system separately, the look-up table further comprises a plurality of reference error values, each reference error value is corresponded to one of the plurality of spectrum parameters, the light-measuring method further comprises following steps of:
  calculating an analogue stimulus value according to the to-be-measured light spectrum parameter and one of the three actual color-matching functions;
  determining an error value according to at least one of the spectrum parameters of at least one of the reference error values; and
  calculating an estimated luminance of the to-be-measured light according to the ratio value of the error value and the analogue stimulus value, and the actual stimulus value corresponded to the actual color-matching function.

9. The light-measuring method of claim 8, further comprising the following step of:
  calculating the plurality of corresponding reference error values according to the plurality of spectrum parameter, a standard color-matching function, and the actual color-matching function.

10. The light-measuring method of claim 1, wherein the three actual stimulus values are corresponded to three actual color-matching functions of the light-measuring system separately, the light-measuring method further comprises following steps of:
  calculating an analogue stimulus value according to the to-be-measured light spectrum parameter and one of the three actual color-matching functions;
  calculating an analogue standard stimulus values according to the to-be-measured light spectrum parameter and a standard color-matching functions; and
  calculating an estimated luminance of the to-be-measured light according to the ratio value of the analogue standard stimulus value and the analogue stimulus value, the actual color-matching functions and the actual stimulus values.

11. The light-measuring method of claim 1, wherein the three actual stimulus values are corresponded to three actual color-matching functions of the light-measuring system separately, the look-up table further comprises a plurality of reference adjustment coefficients, each reference adjustment coefficient is corresponded to one of the plurality of spectrum parameters, the light-measuring method further comprises following steps of:
  determining an adjustment coefficient according to at least one of the corresponded spectrum parameters of at least one of the reference adjustment coefficients; and
  calculating an estimated luminance of the to-be-measured light according to the adjustment coefficient and one of the reference adjustment coefficients.

12. The light-measuring method of claim 11, wherein the three actual stimulus values are corresponded to an actual color-matching functions of the light-measuring system, the light-measuring method further comprises following steps of:
  calculating a plurality of reference stimulus values corresponded to the plurality of spectrum parameters according to the plurality of spectrum parameters and the actual color-matching function;
  calculating a plurality of reference standard stimulus values corresponded to the plurality of spectrum parameters according to the plurality of spectrum parameters and a standard color-matching functions; and
  calculating the corresponding reference adjustment coefficient according to the plurality of reference standard stimulus values and the plurality of reference stimulus values.

13. The light-measuring method of claim 1, wherein the three actual stimulus values are corresponded to an actual color-matching functions of the light-measuring system, the light-measuring method further comprises following steps of:
  calculating a spectral amplitude of the to-be-measured light according to the to-be-measured light spectrum parameter, one of the three actual color-matching functions and the actual stimulus value corresponded to the three actual color-matching functions; and
  calculating an estimated luminance of the to-be-measured light according to the spectral amplitude, the to-be-measured light spectrum parameter and a standard color-matching function.

14. A light-measuring system, comprising:
  a light-sensing module comprising a light filtration element and a light-sensing element, the light-sensing module sensing at least one to-be-measured light to produce three actual stimulus values correspondingly;
  a storage module for storing a look-up table, the look-up table comprising a plurality of spectrum parameters and a plurality of look-up color coordinates based on a light spectrum model, each look-up color coordinate corresponding to one of the plurality of spectrum parameters; and
  a processing module, coupled to the light-sensing module and the storage module, calculating an actual color coordinate according to the plurality of actual stimulus values corresponded to each to-be-measured light, then the processing module determining at least one look-up color coordinate matched with the actual color coordinate according to the look-up table, and determining a to-be-measured light spectrum parameter according to at least one of the spectrum parameters of at least one of the matched look-up color coordinates;
  wherein the processing module calculates three error values according to the to-be-measured light spectrum parameter, the three actual color-matching functions and three standard color-matching functions, then the three actual stimulus values are corrected by the three error values and calculates an estimated color coordinate.

15. The light-measuring system of claim 14, wherein the look-up table further comprises a plurality of error corrected parameters, each error corrected parameter comprises three reference error values corresponded to at least one of the plurality of spectrum parameters, the processing module determines three error values according to at least one of the error corrected parameters of at least one of the matched spectrum parameters, then calculates an estimated color coordinate.

16. A light-measuring system, comprising:
  a light-sensing module comprising a light filtration element and a light-sensing element, the light-sensing module sensing at least one to-be-measured light to produce three actual stimulus values correspondingly;
  a storage module for storing a look-up table, the look-up table comprising a plurality of spectrum parameters and a plurality of look-up color coordinates based on a light spectrum model, each look-up color coordinate corresponding to one of the plurality of spectrum parameters; and
  a processing module, coupled to the light-sensing module and the storage module, calculating an actual color coordinate according to the plurality of actual stimulus values corresponded to each to-be-measured light, then the processing module determining at least one look-up color coordinate matched with the actual color coordinate according to the look-up table, and determining a to-be-measured light spectrum parameter according to at least one of the spectrum parameters of at least one of the matched look-up color coordinates;

wherein the processing module calculates three analogue standard stimulus values according to the to-be-measured light spectrum parameters and three standard color-matching functions, then calculates an estimated color coordinate according to the three analogue standard stimulus values.

17. A light-measuring method for measuring a to-be-measured light by a light-measuring system according to a look-up table comprising a plurality of spectrum parameters and a plurality of look-up color coordinates based on a light spectrum model, each look-up color coordinate corresponding to one of the plurality of spectrum parameters, the light-measuring method comprising the following steps of:

measuring the to-be-measured light by the light-measuring system, for obtaining actual stimulus values, and then calculating an actual color coordinate;

determining at least one of the look-up color coordinate matched with the actual color coordinate according to the actual color coordinate and the look-up table;

determining a to-be-measured light spectrum parameter according to at least one of the spectrum parameters of at least one of the matched look-up color coordinates;

calculating three analogue standard stimulus values according to the to-be-measured light spectrum parameter and three standard color-matching functions; and calculating an estimated color coordinate of the to-be-measured light according to the three analogue standard stimulus values.

18. The light-measuring system of claim 14, wherein the light-sensing element comprises a plurality of light-sensing units, the plurality of light-sensing units are arranged to form a one-dimensional array or a two-dimensional array.

* * * * *